United States Patent
Engelhardt et al.

(10) Patent No.: US 6,403,787 B2
(45) Date of Patent: *Jun. 11, 2002

(54) THERMOPLASTIC MATERIAL CONSISTING OF ALIPHATIC CARBAMIC ACID DERIVATIVES OF POLYSACCHARIDES AND LOW-MOLECULAR UREA DERIVATIVES AS WELL AS A PROCESS FOR THEIR PREPARATION AND USE OF THE SAME

(75) Inventors: Jürgen Engelhardt, Fallingbostel; Joachim Simon, Düsseldorf; Hanns-Peter Müller, Odenthal; Rainhard Koch; Dirk-Jacques Dijkstra, both of Köln, all of (DE)

(73) Assignee: Wolff Walsrode AG, Walsrode (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,213

(22) Filed: Apr. 2, 1997

(30) Foreign Application Priority Data

Apr. 9, 1996 (DE) .......................................... 196 13 990

(51) Int. Cl.$^7$ ............................ C08B 9/00; C08B 15/00
(52) U.S. Cl. ...................... 536/56; 536/123.1; 536/124; 527/103; 428/534
(58) Field of Search .................... 536/56, 124; 527/103; 428/534

(56) References Cited

U.S. PATENT DOCUMENTS

| | | | |
|---|---|---|---|
| 3,508,941 A | 4/1970 | Johnson et al. | 106/125 |
| 4,097,666 A | 6/1978 | Johnson et al. | 536/57 |
| 4,129,451 A | 12/1978 | Menault et al. | 106/108 |
| 4,129,640 A | 12/1978 | Rodier | 264/187 |
| 5,008,359 A * | 4/1991 | Hunter | 527/103 |
| 5,202,433 A * | 4/1993 | Okamoto et al. | 540/200 |
| 5,324,777 A | 6/1994 | Buysch et al. | 525/54.3 |
| 5,639,865 A | 6/1997 | Kalbe et al. | 536/18.5 |

FOREIGN PATENT DOCUMENTS

| | | | |
|---|---|---|---|
| DE | 2358808 | 6/1975 | B01J/1/24 |
| DE | 4338152 | 5/1995 | C08B/31/04 |
| EP | 0626392 | 11/1994 | C08B/13/00 |
| EP | 0668293 | 8/1995 | C08B/37/00 |
| GB | 467992 | 9/1937 | |

OTHER PUBLICATIONS

The Merck Index, Eleventh Edition, Merck & Co., Inc. Rahway, NJ, 1989, p. 4778, Compound No. 4776.*
Encyclopedia of Polymer Science and Engineering, vol. 3 (1985) pp. 163–171 plus cover.
Macromolecules, vol. 18, (1985) pp. 1746–1752 Gunar V. Laivins, Characterization and Chain Stiffness of (Acetoxypropyl) cellulose.
Journal of Applied Polymer Science, vol. 52, (1994) pp. 755–761 Pingland Wang et al., Synthesis and Characterization of Long–Chain Faatty Acid Celulose Ester (FACE).
Journal of Environmental Polymer Degradation, vol. 3, No. 2 (1995) pp. 115–119 Pingland Wang et al., Synthesis of Cellulose–Fatty Acid Esters for Use as Biodegradable Plastics.
Kunststoff Handbuch, vol. 3/1, Munich, 1992 F. Muller, Ch. Leuschke, in Becker/Braun.
Acta Polymerica, vol. 32 (1981) pp. 172–176 Beichelt et al., Uber die Umsetzung von Cellulose und Lignin mit Isocyanaten bzw. Isocyanatgruppenhaltigen Prapolymeren.
Angewandte Chemie, vol. 59, (1947) pp. 257–288 Dr. Otto Bayer, Das Di–Isocyanat–Polyadditionsverfahren (Polyurethane).
British Polymer Journal, vol. 18, No. 4 (1986) pp. 259–262 William B. Banks et al, Mechanical Properties of Alkyl Isocyanate Modified Scots Pine Wood Surfaces.
Birkhauser Verlag, (1957) pp. 754–765 plus cover Dr. Louis Diserns, Neueste Fortschritte Und Verfahren In Der Chemischen Technologie Der Textilfasern.

(List continued on next page.)

*Primary Examiner*—Gary Geist
*Assistant Examiner*—Howard V Owens, Jr.
(74) *Attorney, Agent, or Firm*—Norris McLaughlin & Marcus

(57) ABSTRACT

The present invention relates to evenly substituted polysaccharide derivatives having the general structure:

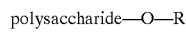

wherein polysaccharide—O represents a substituted or unsubstituted polysaccharide unit and R is a substituent of a polysaccharide-OH group having either the structure

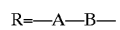

or the structure

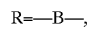

wherein A is a linear polyether chain having the following structure:

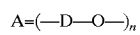

wherein D denotes a linear aliphatic branched or unbranched chain having 2 to 12 C atoms, O represents an oxygen atom and n is a number equal to or greater than 1, and
B represents a substituted carbamic acid having the structure

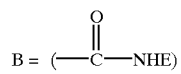

wherein E denotes a linear or branched aliphatic chain having 1 to 18 C atoms.

5 Claims, No Drawings

OTHER PUBLICATIONS

Cellulose Chemistry and Technology, vol. 1 (1967) pp. 23–32 J. Schurz, et al. Cellulose–Pfropfmischpolymerisation mit polyurethan.

T.P. Nevell and S. Haig Zeronian, Cellulose Chemistry and its Applications (1985), Wiley, N.Y. (1985).

Acta Polymerica, vol. 36, No. 7, (1985) pp. 397–398 M.Q. Parwez et al., Formation of oligomers by free radical polymerization of 2, 3–epoxy propyl allyl ether (allyl glycidyl ether).

Polymer News, vol. 15 (1990), pp. 170–175 Burkart Philipp, Organic Solvents for Cellulose.

Journal of Applied Polymer Science, vol. 22, (1978) pp. 1243–1253 H.T. Lokhande, Swelling Behavior of Cotton Fibers in Morpholine and Piperidine.

Acta Polymerica, vol. 39, No. 12, (1988) pp. 710–714 V. Kabrelian, et al., Untersuchungen zur Auflosung der Cellulose in binaren aprotischen Systemen.

Polymer, vol. 31 (Feb. 1990) pp. 348–352 P.N. Lavrenko et al., Conformation of carboxymethylclelulose in cadoxen—water solutions.

Journal of Applied Polymer Science, vol. 27 (19982) pp. 673–685 Yoshifumi Miyagi et al., Carbanilation of Cellulose in the Paraformaldehyde–Dimethyl Sulfoxide Solvent System.

Journal of Applied Polymer Science, vol. 42 (1991) pp. 821–827 Robert Evans et al., Pyridine–catalyzed Depolymerization of Cellulose during Carbanilation with Phenylisocyanate in Dimethylsulfoxide.

Eur. Poly. J., vol. 26, No. 11 (1990) pp. 1217–1220 Adrian F.A. Wallis et al., Side reactions of Phenylisocyanate During Amine–Catalysed Carbanilation of Cellulose.

J. Macromol. Sci.–Chem. A16(2) (1981) pp. 473–479 B.G. Penn et al., Biodegradable Cellulose Graft Copolymers.

Polym. Prepr. Am. Chem. Soc. Div. Poly Chem. 20 (1979) pp. 574–577 B.G. Penn et al., Biodegradable Cellulose Graft Copolymers.

Polymer Letters Edition, vol. 11 (1973) pp. 731–735 Soojaa Kim et al., A New Class of Biodegradable Polymers.

Macromol. Synth. vol. 7 (1979), pp. 101–105 S. Kim et al., Copolymers of Depolymerized Cellulose Triacetate and Diisocyanates.

Polymer, vol. 21 (1980) pp. 648–650 R. Amick et al., Preparation and water sorption properties of cellulose–polypropylene glycol block copolymers.

Polym. Prepr. Am. Chem. Soc. Div. Poly Chem 3 (1990) p. 642 A. Caron et al., Cellulose Triacetate/Polyca[rp;actpme b;pcl Copolymers.

Acta Polymerica, vol. 36, No. 12 (1985) pp. 697–698 Wagenknecht et al., Zur Acylierung von Cellulose nach Auflosung in O–basischen Losemittelsysteme.

Kunststoff Handbuch, vol. 3/1, p. 416, "Modifizierung der organischen Celluloseester", Munich, 1992 Polycarbonate Polyacetale Polyester Celluloseester.

T.P. Nevell and S. Haig Zeronian, Cellulose Chemistry and its Applications (1985), Wiley, N.Y. (1985), pp. 344–363.

Derwent Abstract of JP 142938 (Jun. 10, 1993).

Chemical Abstracts, vol. 115, No. 10, Sep. 9, 1991 abstract No. 94564 Abstract of JP03086779 (Apr. 11, 1991).

* cited by examiner

THERMOPLASTIC MATERIAL CONSISTING OF ALIPHATIC CARBAMIC ACID DERIVATIVES OF POLYSACCHARIDES AND LOW-MOLECULAR UREA DERIVATIVES AS WELL AS A PROCESS FOR THEIR PREPARATION AND USE OF THE SAME

The present invention relates to new materials consisting of thermoplastic aliphatic polysaccharide carbamic acid derivatives, as well as of mixtures of such derivatives with low-molecular urea derivatives, the preparation of such derivatives and mixtures from polysaccharides or polysaccharide derivatives and aliphatic monoisocyanates in a suitable solvent. The materials according to the invention, after removal of the solvents. are preferably processed as thermoplastic material by injection moulding or extrusion. Mouldings, fibres, films, as well as foams or coatings can be produced.

It is known that thermoplastically processable materials can be produced from polysaccharides, in particular from starches or celluloses, by esterification or etherification of the free hydroxyl groups in a homogeneous reaction process (cf. Encyclopaedia of Polymer Science and Technology Vol. 3, 1985).

Thermoplastic materials are also correspondingly obtained, for example, according to EP 626 392, by esterification of polysaccharide hydroxyalkyl ethers.

JP 142938 and Macromolecules 18, 1985, 1746–1752 describe the reaction of cellulose ethers with acid chlorides or with carboxylic anhydrides.

J. Appl. Polym. Sci. 52. 1994, 755–761. and J. Env. Polym. Degr. 3, 1995, 115–118 describe the preparation of thermoplastic cellulose esters from cellulose and long-chain unsaturated fatty acids in pyridine/DMF.

The thermoplastic processability of polysaccharide derivatives is dependent on the average degree of substitution of the anhydroglucose repeat unit, referred to below as DS, which in the case of thermoplastic aliphatic cellulose ester derivatives, for example, is at least approximately 2.0.

To obtain thermoplastic processability, it is necessary to add further auxiliary substances, especially plasticisers,to these polysaccharide-derivatives (F. Müller, Ch. Leuschke, in Becker/Braun: Kunststoff-Handbuch Vol. 3/1, Hanser Verlag, Munich, 1992).

Whereas the etherification is usually carried out by reacting alkali cellulose with epoxides such as, for example, ethylene oxide or propylene oxide, in an inert suspending medium, esterifications are usually carried out in a solvent process using acids as solvents. Here the swelling process also serves to activate the cellulose (Encyclopaedia of Polymer Science and Technology Vol. 3, 1985).

Comparably, the steady reaction of polysaccharides with substituted isocyanates or substituted isothiocyanates likewise succeeds only in the case of easy accessibility of the cellulose chains in homogeneous solution or in solvents having a very strong swelling effect.

Acta Polymerica 32, 1981, 172–176 specifies that dry cellulose does not react satisfactorily with isocyanates in the absence of solvents and further catalysts. Reactions in solvents which are not capable of at least initiating swelling in the cellulose do not produce satisfactory reactions with the cellulose (Ang. Chem., 59, 1947, 257–288).

B. Polym. J., 18, 1986. 259–262 describes the reaction of wood cellulose with alkyl monoisocyanates. The formation of urethane remains limited to the surface of the polysaccharide fibres.

DE 2358808 describes the reaction with long-chain mono- and diisocyanates, which is limited to the surface of cellulose powders.

L. Disserens, in "Neueste Fortschritte und Verfahren in der chemischen Technologie der Textilfasern", Birkhäuser Verlag, Stuttgart, 1957, presents a survey of the reactions of textile fibres with mono- and diisocyanates which are limited to the surface. Long-chain alkyl isocyanates are preferably used here for the purpose of hydrophobing the textile material. GB 467 992 describes the heterogeneous reaction with isocyanates of textile fibres which have been previously reacted with alkylene oxides. In the reaction carried out in petroleum spirits, however, no significant swelling of the cellulose results.

In addition the mechanical properties of paper can be influenced by the reaction of isocyanates with the cellulose fibres (Acta Polymerica 32, 1981, 172–176). However, for this preferably multifunctional isocyanates, particularly preferably diisocyanates, are used, which are not the subject matter of the present invention.

Average degrees of conversion of cellulose with isocyanates are obtained using solvents and catalysts especially when the cellulose is in the swollen condition. This can be achieved through the use of a suitable solvent or else through the use of a derivative of the cellulose or of a polysaccharide together with a suitable solvent. The formation of the urethane bond can also be brought about here by an additional back process (Cell. Chem. Technol. 1, 1967, 23–32).

The swelling of the cellulose can be achieved by initial swelling in water and subsequent exchange for a polar aprotic solvent.

Alternatively, solvents having a strongly swelling or solvent effect on cellulose, such as DMAc, DMSO, DMAc/LiCl or DMSO/formaldehyde mixtures, can also be used directly (U.S. Pat. Nos. 4,129,451, 4,129,640, 4,097,666). Surveys of solvent systems are published in Nevell and Zeronian: Cellulose chemistry and its applications, Wiley, N.Y., 1985, Acta Polym. 36 (1985), 697–698 and Polymer News 15, (1990), 170–175.

Also described as being good swelling or dissolving systems are, for example, morpholine/piperidine mixtures (J. Appl. Polym. Sci., 22, (1978), 1243–1253, as well as amine-N-oxides (Acta Polymerica, 39, (1988), 710–714, U.S. Pat. No. 3,508,941) and metal cation/solvent systems such as $Cu/NH_3$ or Cd/ethylenediamine (Polymer 31, (1990), 348–352).

The reaction of phenyl isocyanate with cellulose in DMSO/paraformaldehyde mixtures is described in J. Appl. Pol. Sci. 27, (1982), 673–685, J. Appl. Pol. Sci. 42, (1991), 821–827, and in Nevell and Zeronian: Cellulose chemistry and its applications, Wiley, N.Y., 1985.

High degrees of conversion are favoured especially by the addition of catalysts, by a reaction period of an appropriately chosen length or by elevated temperatures. On the other hand, the formation of isocyanurates is catalysed by means of amines in DMAc, DMSO or DMF as swelling agents or solvents (Eur. Polym. J., 26 (11), (1990), 1217–1220).

The patents and publications listed below describe the reaction of soluble cellulose acetate having degrees of substitution DS<3.0 with isocyanates. isocyanate prepolymers or isocyanate-functionalised polymers or oligomers in homogeneous solution. After the formation of the urethane, the acetate groups can be saponified and the urethane derivatives of the unsubstituted cellulose can be isolated.

J. Macromol. Sci. Chem. A 16 (1981) 473. Polym. Prepr. Am. Chem. Soc. Div. Poly. Chem. 20 (1979) 574, J. Poly. Sci. Polym. Lett. ed. 111 (12) (1973) 731–735, Macromol. Synth. 7, 101–105, Polymer 21 (1980) 648–650, Polym. Prepr. Am. Chem. Soc. Div. Poly. Chem. 3 (1990) 642, U.S. Pat. No. 3,950,28.

Thermoplastically processable aliphatic carbamates starting from polysaccharides or polysaccharide hydroxyalkyl ethers are not known.

The object of this invention is to identify reaction conditions for the reaction of polysaccharide derivatives. preferably those from renewable raw materials and derivatives of these, with isocyanates, such that average to high degrees of conversion are obtained. For this was required in particular a reaction under homogeneous conditions, that is. a solution of the polysaccharide derivative in the solvent, and at least a solvent having a very strong swelling effect.

Surprisingly, it has now been found that cellulose derivatives, and particularly preferably cellulose alkyl ethers which are not soluble or highly swellable in the solvents used according to the invention, pass into solution or begin to swell strongly during the reaction with alkyl monoisocyanates and consequently lead to average to high degrees of conversion.

Examples of polysaccharide components which may be mentioned in particular are hydroxypropyl cellulose and hydroxyethyl cellulose. Aprotic polar and nonpolar solvents, preferably cyclic ethers or substituted aromatics, particularly preferably dioxane and toluene, can be used as solvents in the process according to the invention.

It has also been found, surprisingly, that the products a of this process according to the invention are thermoplastically processable and especially the by-products b of the process according to the invention improve the thermoplastic processability of the products according to the invention. This surprising result of the procedure according to the invention could not have been anticipated by the person skilled in the art. The person skilled in the art had to anticipate that the by-products b would decompose during subsequent thermoplastic processing and form interfering gaseous decomposition products.

The molar ratio of the components a and b is given by the formula $$0.01 < b/(a+b) < 0.5.$$

The molar ratio $b/(a+b)$ is particularly preferably at least 0.05 and in particular 0.1 to 0.2. If the limiting value of 0.5 in the above formula is exceeded, that is, if the proportion of by-product is increased, the product no longer possesses mechanical properties which render possible its practical use.

The function according to the invention of the product b operates only if the melting temperature of B is lower than the processing temperature.

The new compounds correspond to the general structure:

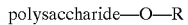

wherein polysaccharide-O represents a substituted or unsubstituted polysaccharide unit and R is a substituent of a polysaccharide-OH group having either the structure

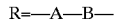

or the structure

wherein A is a linear polyether chain having the following structure:

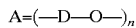

wherein D denotes a linear aliphatic branched or unbranched chain having 2 to 12 C atoms, O represents an oxygen atom and n is a number equal to or greater than 1.

B represents a substituted carbamic acid having the structure

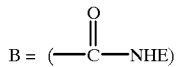

wherein E denotes a linear or branched aliphatic chain having 1 to 18 C atoms.

The invention accordingly provides thermoplastically processable urethane derivatives of polysaccharides or polysaccharide ethers which have been reacted with isocyanates or blocked isocyanates at average degrees of substitution (referred to the anhydroglucose unit) of DS equal to 0.3 to 3.0, preferably 0.6 to 2.5.

The invention also provides the mixture of the polysaccharide urethane derivatives according to the invention with low-molecular symmetrical and asymmetrical aliphatic urea derivatives, having chain lengths of 1 to 20 carbon atoms.

The invention further provides a process for the preparation of such thermoplastic polysaccharide urethanes, polysaccharide ether urethanes and mixtures of these with low-molecular urea derivatives, which is characterised in that the polysaccharide or the polysaccharide ether is introduced into a nonsolvent together with a suitable catalyst and is then converted by means of an isocyanate into the corresponding urethane, the polysaccharide urethanes or polysaccharide ether urethanes thus formed and the low-molecular urea derivative being soluble in the solvent or suspending medium used. The product can be isolated in the process according to the invention by a precipitation or by an evaporating extrusion.

For the synthesis, a cellulose derivative is refluxed in a suspending medium and, after addition of a catalyst, the isocyanate compound is added dropwise. Here it is to be regarded as surprising that the isocyanate reacts with the polysaccharide or with the polysaccharide ether in a solid-liquid two-phase reaction in standard suspending media. In suspending media such as dioxane and toluene the reaction products pass into solution during the reaction and can be isolated by distillation or precipitation in nonsolvents, for example, with water, acetone, or alkanes.

The degree of conversion of the polysaccharide derivative can be adjusted within wide limits through the stoichiometry and the progress of the reaction. In this connection a degree of substitution of greater than 0.5 is sufficient to provide a thermoplastically processable material. At normal pressure and room temperature, polysaccharides and polysaccharide derivatives may contain a small per cent by weight of water. The secondary reaction of the isocyanate compounds with water leads to the formation of by-products. among which are preferably disubstituted ureas. The extent of the formation of by-products is here highly dependent on the water content of the reaction solution. These by-products have melting temperatures <200° C. and, unless they are removed during the working-up of the polysaccharide derivatives, lead to a distinct improvement in the thermoplastic processability of the product. This outcome is surprising to the person skilled in the art and was not predictable.

Industrially available polysaccharide derivatives of any molecular weight are suitable for the synthesis.

If polysaccharide ethers and in particular cellulose ethers are used. examples of suitable cellulose ethers are methyl cellulose. ethyl cellulose or benzyl cellulose having average degrees of substitution of less than or equal to 2.5. hydroxyethyl cellulose, hydroxypropyl cellulose, dihydroxypropyl cellulose, hydroxybutyl cellulose, methylhydroxyethyl cellulose, methylhydroxypropyl cellulose, methylhydroxybutyl cellulose, ethylhydroxypropyl cellulose, ethylhydroxyethyl cellulose, carboxyalkyl cellulose, sulphoalkyl cellulose, cyanoethyl cellulose and mixed ethers thereof.

Suitable suspending media and solvents are ketones such as, for example, methyl ethyl ketone, ethers and cyclic ethers such as, for example, dimethoxyethane, dimethoxymethane, dimethyl ether, diethylene glycol dimethyl ether. dioxane and tetrahydrofuran, acetals, hydrocarbons and polar aprotic compounds such as dimethyl sulphoxide, dimethylformamide, dimethylacetamide, N-methylmorpholine, N-methylpyrrolidone. trialkyl phosphate, ethyl acetate as well as nonpolar aprotic solvents such as toluene. Dioxane and toluene are preferred.

Suitable isocyanate compounds are aliphatic linear and branched monoisocyanates having saturated or unsaturated alkyl chains such as, for example, methyl isocyanate, ethyl isocyanate, propyl isocyanate, isopropyl isocyanate, butyl isocyanate. pentyl isocyanate, hexyl isocyanate, heptyl isocyanate, octyl isocyanate, nonyl isocyanate, decyl isocyanate, undecyl isocyanate, dodecyl isocyanate, tetradecyl isocyanate. hexadecyl isocyanate, octadecyl isocyanate, the corresponding isothiocyanates as well as any mixtures of the above-mentioned monoisocyaniates and isothiocyanates.

Suitable catalysts for the reaction are amines, particularly sterically hindered tertiary organic amines such as trimethylamine, triethylamine, tributylamine, tetramethylene-diamine, pyridine, N,N-dimethylcyclohexyldiamine, N,N-dimethylbenzylamine, 4-pyrilidinopyridine, permethyldiethylenetriamine, 1,4-diazabicyclo[2.2.2]octane, 1,8-diazabicyclo[5.4.0]undec-7-ene, 1,5-diazabicyclo[4.3.0]non-5-ene and any mixtures thereof.

The catalysts conventional in polyurethane chemistry such as, for example, organotin compounds. are equally suitable.

During the catalysis the quantity of amine added affects the degree of derivatisation of the polysaccharide. For the reaction with the polysaccharide derivative, the amine is added in a molar ratio to the polysaccharide of from 0.01 to 3, preferably from 0.1 to 1.

The temperature of the reaction of the polysaccharide derivative with the isocyanate is 20° C. to 150° C., preferably 40° C. to 130° C., particularly preferably 50° C. to 120° C. The reaction times are from 0.5 to 16 hours, preferably 0.5 to 8 hours, particularly preferably 0.5 to 4 hours.

The polysaccharide ether esters obtainable by the process according to the invention are soluble or highly swellable in organic solvents such as dioxane. tetrahydrofuran, toluene, methylene chloride. chloroform.

Moreover, these compounds are thermoplastically processable after removal of the solvents and can be converted by means of the conventional processing techniques such as extrusion into, for example, injection mouldings, films or fibres.

The process according to the invention is also characterised in that by-products, particularly preferably dialkylureas, are formed during the reaction, depending on the water content of the polysaccharide component. The retention of these by-products in the product improves the thermoplastic processability of the cellulose ether urethane derivatives.

The polysaccharide derivatives and mixtures thereof with low-molecular urea derivatives according to the invention are suitable for the production of coatings, fibres, powders, films, foams and mouldings. Their properties can be varied by preparing blends of any composition with other components such as, for example, polysaccharides and polysaccharide derivatives or polyurethanes. Combination with plasticisers, fire-protecting agents, pigments and processing aids such as, for example, long-chain fatty acid amides, is also possible here. Especially the addition of plasticisers such as, for example, triethylene glycol, lactic esters or tartaric esters, improves the thermoplastic processability and renders possible processing even at low degrees of substitution such as, for example, a DS equal to 0.6.

The subject matter of the present invention is explained in more detail by means of the available Examples.

EXAMPLES

First Comparative Example 0.05 mol of wood pulp (Pn=1200) and 0.025 mol of triethylamine are refluxed for 30 minutes in 500 g of dioxane. 0.15 mol of stearoyl isocyanate is then added dropwise, the suspension is stirred under reflux for 9 hours, precipitated from acetonitrile, filtered under suction, washed with acetone and dried under a slight vacuum. An inhomogeneous product which cannot be heat-softened is obtained.

Second Comparative Example 0.05 mol of wood pulp (alistaple) and 0.025 mol of triethylamine are refluxed for 30 minutes in 300 g of dioxane. 0.15 mol of stearoyl isocyanate is then added dropwise, the suspension is stirred under reflux for 9 hours. precipitated from acetonitrile, filtered under suction, washed with acetone and dried under a slight vacuum. An inhomogeneous product which cannot be heat-softened is obtained. Process according to the invention:

Example 1

0.025 mol of hydroxypropyl cellulose (DS 0.9) and 0.0125 mol of triethylamine are refluxed for 30 minutes in 150 g of dioxane. 0.05 mol of stearoyl isocyanate is then added dropwise and the suspension is stirred under reflux for 9 hours. In the course of this a highly viscous. clear solution is formed. The product is precipitated from acetonitrile, filtered under suction, washed with acetone and dried under a slight vacuum. A white product, which forms a melt of low viscosity at 210° C. and contains bis-stearoyl urea, is obtained in a yield of 93%. (FT-IR: C=O stretching vibration, urethane 1720 $cm^{-1}$; C=O stretching vibration, urea 1615 $cm^{-1}$; N—H deformation vibration, urea 1575 $cm^{-1}$). To control the IR spectra, the bis-stearoyl urea was prepared directly by reacting 0.05 mol of stearoyl isocyanate with 0.1 mol of water in 100 g of dioxane, the precipitated urea was filtered off and the FT-IR spectrum was recorded: (FT-IR: C=O stretching vibration, urea 1615 $cm^{-1}$; N—H deformation vibration, urea 1575 $cm^{-1}$).

A glass-clear film was pressed out of the product containing bis-stearoyl urea at 200° C. and 200 bar. The film is characterised by a modulus of elasticity of 340 MPa, an elongation at tear of 22% and a tear strength of 10 MPa.

The bis-stearoyl urea can be removed quantitatively with cyclohexane by Soxhlet extraction. The resulting hydroxypropyl cellulose stearoyl carbamate has a degree of substitution per anhydroglucose repeat unit of DS 1.4, determined by 13—C—NMR (CP-MAS), and melts at 210° C.

Example 2

0.025 mol of hydroxypropyl cellulose (DS 0.9) and 0.0125 mol of triethylamine are reacted with 0.075 mol of stearoyl isocyanate as in Example 1. After the extraction, a hydroxypropyl cellulose stearoyl carbamate having a DS of 1.8 is obtained. The product melts at 210° C.

Example 3

0.025 mol of hydroxypropyl cellulose (DS 0.9) and 0.0125 mol of triethylamine are reacted with 0.075 mol of dodecyl isocyanate as in Example 1. After the extraction, a hydroxypropyl cellulose dodecyl carbamate having a DS of 1.3 is obtained. The product melts at 200° C.

Example 4

0.025 mol of hydroxypropyl cellulose (DS 0.9) and 0.0125 mol of triethylamine are reacted with 0.075 mol of butyl isocyanate as in Example 1. The reaction product is precipitated from acetonitrile and does not contain dibutyl urea in a quantity detectable in the IR spectrum, so that an extraction is omitted. The product melts at 240° C. and has a DS of 1.4. By adding a suitable plasticiser such as, for example, triethylene glycol. it is possible to carry out the thermoplastic processing at temperatures of <200° C.

What is claimed is:

1. A mixture of cellulose alkyl ether derivatives having the structure:

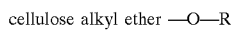

wherein cellulose alkyl ether—O represents a substituted or unsubstituted cellulose alkyl ether unit and R is a substituent of a cellulose alkyl ether—OH group having either the structure

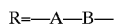

or the structure

wherein A is a linear polyether chain having the following structure:

wherein D denotes a linear aliphatic branched or unbranched chain having 2 to 12 C atoms, O represents an oxygen atom and n is a number equal to or greater than 1, and B represents a substituted carbamic acid having the structure

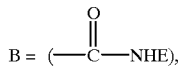

wherein E denotes a linear or branched aliphatic chain having 1 to 18 C atoms,
with a disubstituted urea wherein said disubstituted urea is low-molecurlar weight symmetrical or asymmetrical aliphatic urea derivative having a chain length of 1 to 20 carbon atoms or a combination of said symmetrical and asymmetrical aliphatic urea derivatives.

2. Thermoplastically processable urethane derivatives cellulose alkyl ethers according to claim 1, wherein said cellulose alkyl ethers have been reacted with isocyanates or blocked isocyanates to average degrees of substitution (referred to the anhydroglucose unit) of DS equal to 0.3 to 3.0.

3. Mixtures of the urethane derivatives of cellulose alkyl ethers according to claim 2, having low-molecular symmetrical or asymmetrical aliphatic urea derivatives having chain lengths of 1 to 20 carbon atoms or with a combination of said symmetrical and asymmetrical aliphatic urea derivatives.

4. Process for the preparation of the thermoplastic cellulose alkyl ether derivatives of claim 1, wherein a cellulose alkyl ether is introduced into a medium in which said cellulose alkyl ether is not soluble, together with a suitable catalyst and is then converted by means of an isocyanate into the corresponding urethane, whereby the cellulose alkyl ether urethanes are thus formed, together with a low-molecular urea derivative, both of which are soluble in the medium used.

5. Fibres, films, foams and moldings comprising a cellulose alkyl ether derivatives of claim 1.

* * * * *